United States Patent [19]

Muncada

[11] Patent Number: 5,320,321
[45] Date of Patent: Jun. 14, 1994

[54] DRIVERS ENTERTAINER SET

[76] Inventor: Cesar G. Muncada, 1225 Pecos Way, Sunnyvale, Calif. 94089

[21] Appl. No.: 669,347

[22] Filed: Mar. 14, 1991

[51] Int. Cl.$^5$ .............................................. A47B 23/00
[52] U.S. Cl. ................... 248/447.2; 248/443; 84/291
[58] Field of Search ............... 248/447.2, 448, 443, 248/444.1, ; 108/44, 45; 224/276; 84/291, 294, 295, 327

[56] References Cited

U.S. PATENT DOCUMENTS

| | | | |
|---|---|---|---|
| 198,038 | 12/1877 | Norton | 248/443 |
| 1,116,091 | 11/1914 | McDonald | 108/44 X |
| 2,546,757 | 3/1951 | Krarup | 248/443 |
| 2,746,821 | 5/1956 | Schroeder | 108/44 |
| 2,866,381 | 12/1958 | Alldredge | 108/44 X |
| 3,643,606 | 2/1972 | Vise | 108/44 |
| 4,374,498 | 2/1983 | Yellin | 108/42 X |
| 4,702,453 | 10/1987 | Bishop | 248/447.2 |
| 4,818,021 | 4/1989 | Roysher | 297/458 X |
| 4,892,334 | 1/1990 | Sinclair | 248/441.1 X |

FOREIGN PATENT DOCUMENTS 2025003 12/1971 Fed. Rep. of Germany ........ 108/44

Primary Examiner—Karen J. Chotkowski

[57] ABSTRACT

A driver's entertainer set includes an integral lighting system (1) for illuminating the reader's and player's materials while at the driver's seat or elsewhere at the motor vehicle remote fringes in an emergency inspection or repair. The book rest assembly (1a) can be tilted front and back and adjusted sideways to follow the angular or lateral spread of the books and other reading materials for user's convenience. The resonator bar assembly (1b), through its holed resonator bars that allow tuned tensioned suspended strings way, and mounting, generates sound and vibrations triggered by fingers strumming against the strings, induces and propagated into the said bars, translated or converted into melodic, sound as felt by the attached transducers or nearby microphone for reproductive amplifications. The front hanger assembly (1c) supports and holds the driver's entertainer set through its interconnective components such as the ridge or threaded shaft, sliding blocks, tubular housing, hanger sliding blocks, the corresponding mounting accessories of the one ended hook turnbuckle, keeping the said set at the motor vehicle steering wheel firmly in place. The secondary resonator bar (1d) compliments the bars vibrating performance on one end or the other as said bars are interconnected by sets of strings to simulate and transfer vibrations carried; utilize, delayed, or even more intensified intervibrative reactions along and within the path of vibrative motions. The secondary resonator bar's strings and the tertiary bar, is positioned to harness and utilize waves of harmonic micro-vibrations in its effort to maximize frequency spectrum usage as a result of said vibrations that are sensed and pick up by both transducers or microphones, and other monitoring devices.

9 Claims, 5 Drawing Sheets

DRIVERS ENTERTAINER SET

BACKGROUND OF THE INVENTION

1. Field of the Invention

The most recent invention pertains to drivers entertainer set, more particularly relates to a combined portable musical instrument; book holder; writing surface supporter and holder of various light stuff such as notes and snacks.

2. Description of the Prior Art

Several types of art and mechanical devices are known in the prior art. An illustreous example of such art is found in U.S. Pat. No. 198,038 which issued to E. A. Norton on Dec. 11, 1877. This Patent discloses a portable rack attachment to pianos and other keyboard instruments for music player's comfort in musical rendition as players looked at the musical notes held by the rack attachment art. U.S. Pat. No. 1,116,091 which issued to J. A. McDonald on Nov. 3, 1914 discloses a combined leveling and supporting shelf for clocks. U.S. Pat. No. 2,546,757 which issued to K. Krarup on Mar. 27, 1951 discloses a collapsible music holding attachment for guitar; used to clamp and hold musical notes. U.S. Pat. No. 2,746,821 which issued to F. M. Schroeder on May 22, 1956 discloses an automobile steering wheel table portably used in a car. U.S. Pat. No. 2,866,381 which issued to E. Alldredge on Dec. 20, 1958 discloses a stereographic map reading apparatus used as portable holding table for stereographic serial photography and can be mounted on a car steering wheel. U.S. Pat. No. 2,025,003 which issued to Walter Heitz on Dec. 2, 1971 discloses a portable multi-purpose car table mountable on car steering wheel. U.S. Pat. No. 3,643,606 which issued to Mathias Joseph on Feb. 22, 1972 discloses a table structure for use in motor vehicles foldable, portable and mountable on car steering wheel. U.S. Pat. No. 4,374,498 which issued to Bernard Yellin on Feb. 22, 1983 discloses a support and joiner means for shelving that secures rods and strings in clamping engagement. U.S. Pat. No. 4,702,453 which issued to John A. Bishop on Oct. 27, 1987 discloses a universally positionable book holder which any one can use for holding printed material which anyone can use when a desk surface is not available. U.S. Pat. No. 4,818,021 which issued to Martin Roysher on Apr. 4, 1989 discloses a user variable chair whose structure and design follows the shape of human contour, using a string kind material for the user's comfort. U.S. Pat. No. 4,892,334 which issued to Gary A. Sinclair on Jan. 9, 1990 discloses a portable clipboard and storage box which carry and support writing materials therein at the same time offers writing surface.

While the above mentioned devices and gadgetries are suited for their intended applications and usage, none of these devices mentioned disclose musical interactions, remote lighting capabilities in road emergency cases and modular differentiality. Further neither one among them made use of a threaded means of rigid book holder support an additional feature of the recent invention, not contemplated by the prior art. The lighting system's detachability from the said set for extra flexibility, the unobvious creation of a writing area brought about by the suspended strings coupled with its inherent instrumentative nature, distinctly and abundantly presents a more versatile, unique, superior product to that of the prior art. The continuing need for product improvement is highly appreciated; in this regard, the recent invention effort towards this end, arouses the motivations and perception of the inventor to which it wishes to address.

SUMMARY OF THE INVENTION

In view of the functional inflexibilities and inherent disadvantages of the above mentioned now prior art, the very recent invention provides an improved portable drivers entertainer set. The general purpose of the recent invention which will be described later in greater detail, is to provide quality musical entertainment convenient to motor vehicle drivers who are simply waiting, stranded or otherwise doing nothing. Clearly, the recent invention has all the advantages against the prior art and none of the disadvantages.

To attain these, representative embodiments of the most recent invention are illustrated in the drawing for more detail. The book rest assembly, includes a lighting system that in itself can be remotely used along the fringes of the motor vehicle to light up spots during a road emergency, a benefit and advantage that the prior art did not have. The pivotal or lateral spread of the book rest which cradles the reading materials could get close to 180 degrees for convenient reading adjustment. The resonator bar assembly, through its resonator bars, and strings vibrations amplified electronically, generates the musical sound which resonate to the human ear for reception. These all happen when fingers strum the strings which trigger vibrations and cause stimulations on the bars, sense and pick up by the attached transducers and monitored by the nearby microphone for amplifications and reproductions.

The invention, unobviousness in its conceptual designe, structural, functional and operational features, offers various novel characteristics and improvement not found in prior art. Perhaps, the maximum potential capabilities of said set cannot as fully, yet be exhaustedly explored. However, in the interest of continuing quality improvement which the public deserves, the merits and benefits of the invention with its inherent advantages, should pave a way into the world of musical instrument manufacturing industry. Relative to the optional features desired, the invention should sell at a minimum reasonable cost. The objective of the invention is to offer an improved, flexible, portable, and modular adoptable product condusive to relaxation, entertainment and responsive to motorist road emergency.

It has thus been outlined, rather broadly, the more important features of the invention in order that the detailed descriptions thereof that follows may be better understood, so that the recent contribution to the art be clearly illustrated. There are, of course, additional features of the invention that will be describe hereafter and which will form the subject matter of the claims appended hereto. In this regard, before explaining at least one embodiment of the invention in detail, it is to be understood that the invention is not limited in its applications to the detail of construction and to the arrangement of the component parts set forth in the following descriptions and drawing illustrations.

The invention is capable of other embodiments being practiced and carried out in various ways. Likewise, it is to be understood that the semantics and phraseology utilized herein are for the purpose of descriptions and should not be regarded as limiting. Those skilled in the art will appreciate the conception upon which this disclosure is based, which may readily be utilized as a basis for designing other structures, methods, and systems for carrying out several other purposes of the recent invention. Hence, the claims may be regarded as including such equivalent constructions insofar as they do not depart from the spirit and scope of the recent invention. The foregoing abstract is to enable the U.S. Patent and Trademark Office and the public in general, specially engineers, scientists, and practitioners in the art not familiar with patent or legal parlance, determine quickly from cursory inspections the nature and essence of the application technical disclosure.

It is therefore the object of the recent invention to provide a new and improved portable driver's entertainer set which has all of the advantages over the prior art. It is further the object of the recent invention to achieve a quality, durable and reliable product to enable owners transit convenience and to organize safekeeping and shipping ease due to its foldability and detachability criterion which made the set an integrally compact instrument of lasting use. These together with other objects of the invention, along with the various novelty features pointed out in particularity in the claims annexed to and forming a part of this disclosure. For better understanding of the invention, its operating advantages and the specific object attained by its uses, reference should be made to the accompanying drawings and descriptive matters in which there are illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
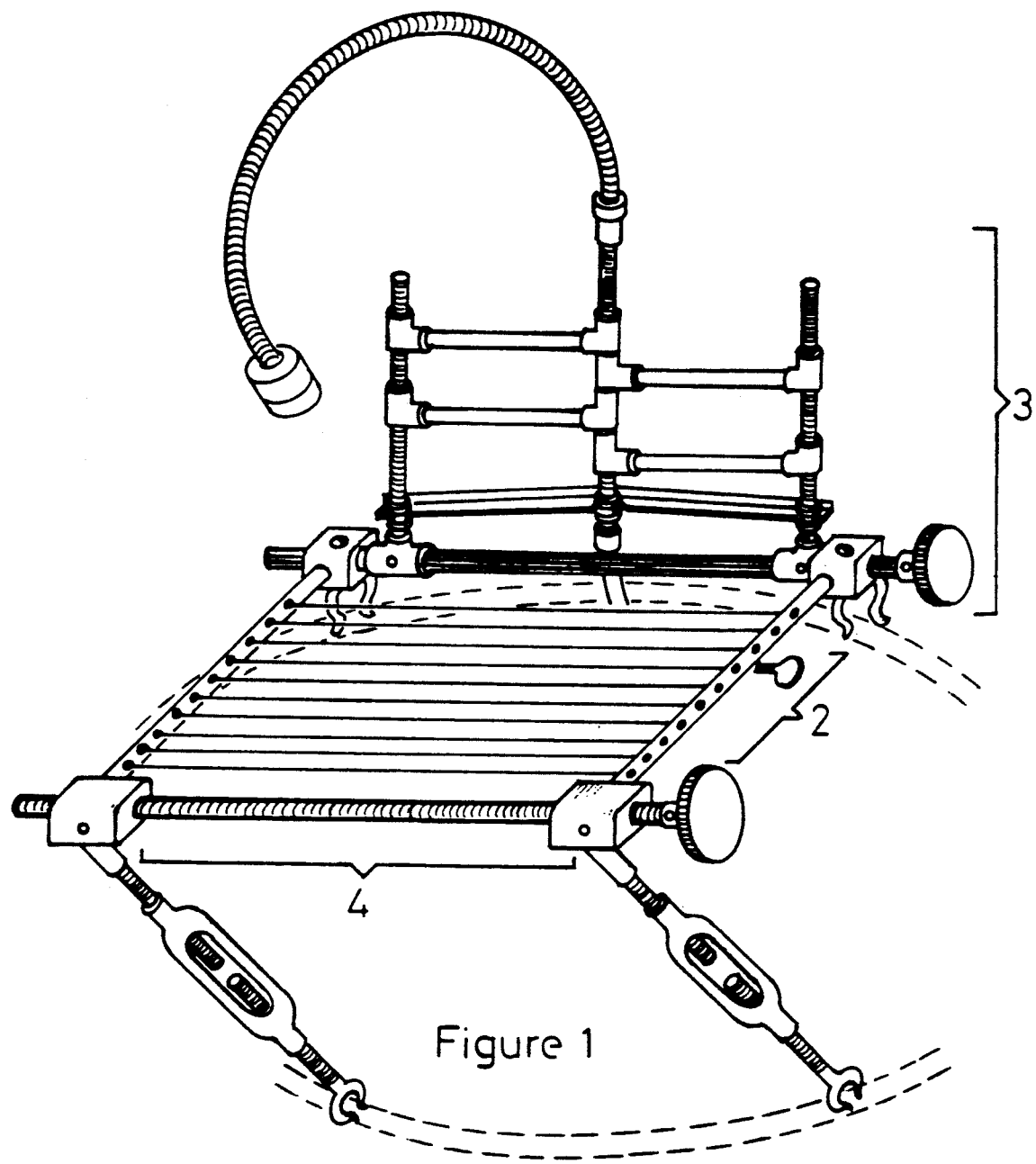
FIG. 1 is an isometric drawing illustrating the various sectional assemblies which as a whole forms the driver's entertainer set according to the first embodiment of the recent invention found in the abstract and the subsequent embodiments.

With reference now to the drawings, and in particular to FIG. 1 thereof, a new and improved driver's entertainer set embodying the principles and concept of the recent invention and generally designated by the reference numerals in FIG. 1 will be described. More specifically, it will be noted that in the abstract embodiment of the invention that section 1 is the book rest assembly. It comprises parts that interconnect with other parts as follows: the ridge or threaded shaft 26 is provided with cutouts somewhere along the length for c clip 40 mounting used as a controlling hold in area choice variance of the set. The shaft is commonly shared in mounting by the resonator bar assembly, the book rest assembly and the front hanger assembly to ensure a smooth and a ridgid interconnection mounting. The inside threaded couplers 24 with set screws allows the front and back and lateral adjustment of the book rest assembly, and also accommodates the twist mounting of the outside threaded rods 18 which in turn takes the twist mounting of the inside threaded tubing joins 20 that connect the two end outside threaded tubings, to firmly interconnect the rods on both sides to hold said assembly upright. The book holder 14 is held against the middle rod by a clamp 34 and in between held by sets of nuts 36 to ensure mechanical ridgidity. The lighting system assembly is provided with extendable electrical wires 10 connected to the light bulb holder 8 which can be either mounted at the top or bottom for direct or indirect light propagations, illumination and reproductions. The fiber optic cable 2 which carries the light from the light bulb is supported by fiber optic cable holder 4 and fiber optic cable insulating cover 2a, to the double threaded join 28 and to the light lens assembly.

Figure 2:
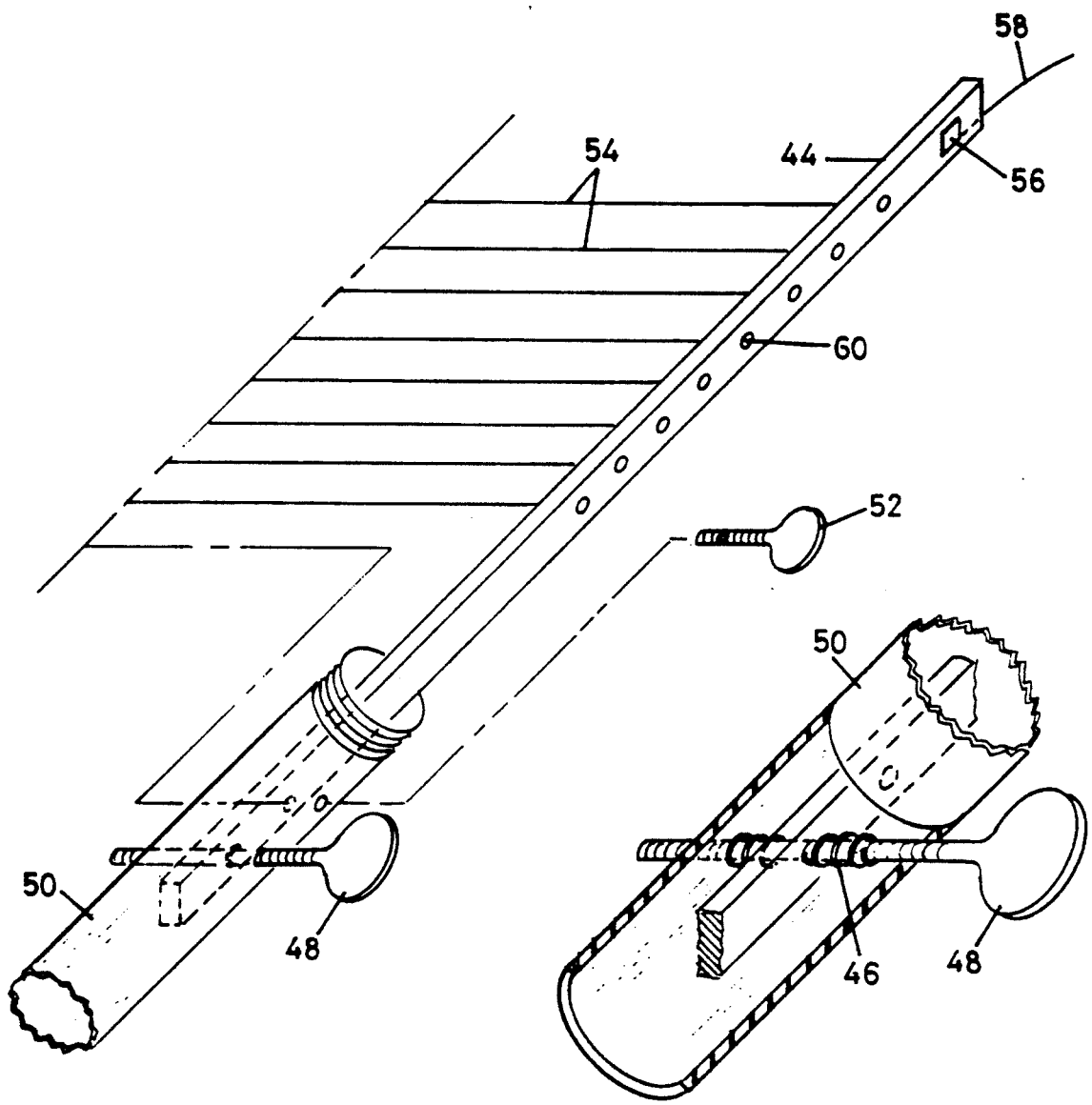
FIG. 2 illustrates the resonator bar assembly of section 2 of said set which shows how the strings are routed through its mounting adjusting screws into the resonator bar, and on to the secondary resonator bar assembly as indicated by the strings cut.
Figure 3:
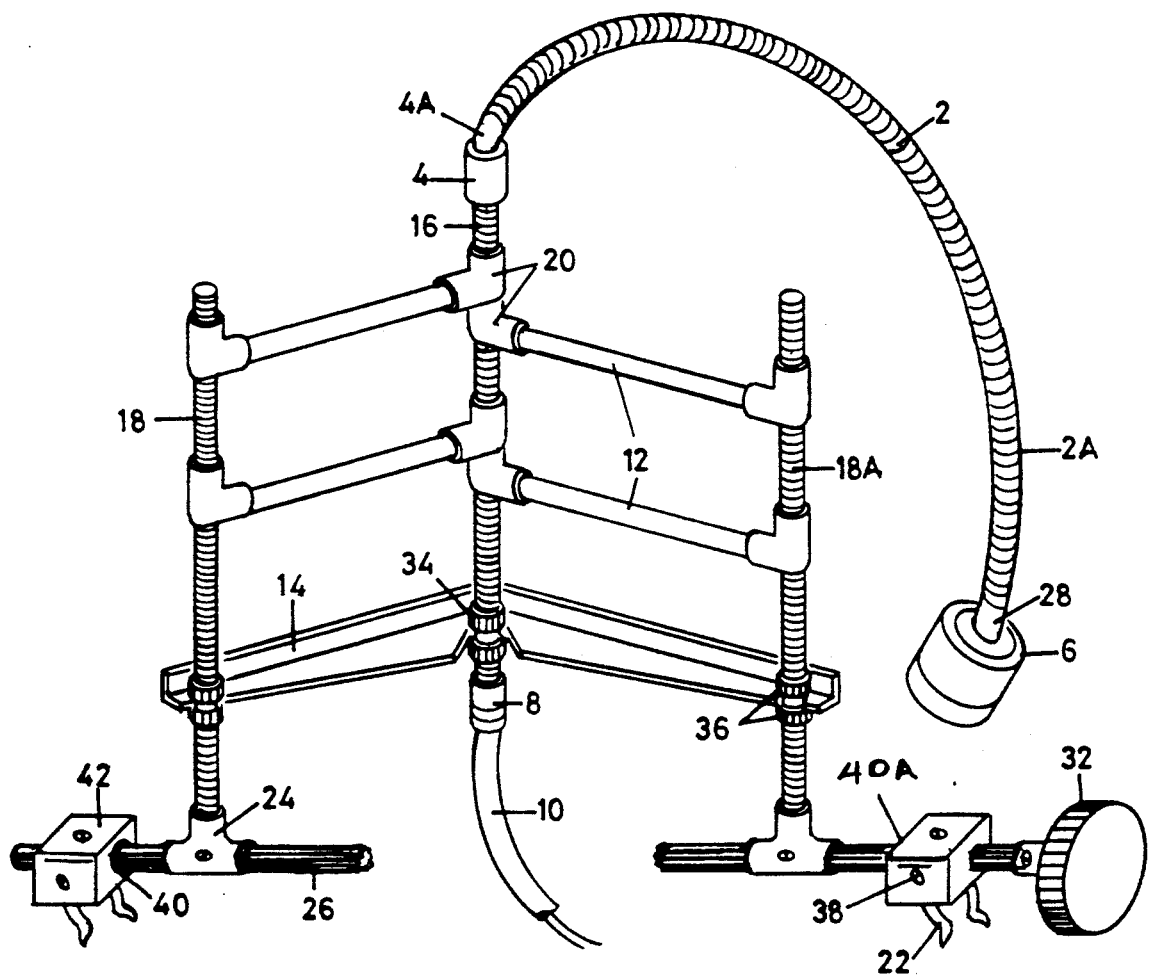
FIG. 3 is a perspective view of the book rest assembly of section 1 of the driver's entertainer set showing the mounted lighting system, the sliding or flopping book rest holder, the interconnected structural support rods, tubing, tubing join, coupler and the necessary mounting supports with its optional lens features.
Figure 3:
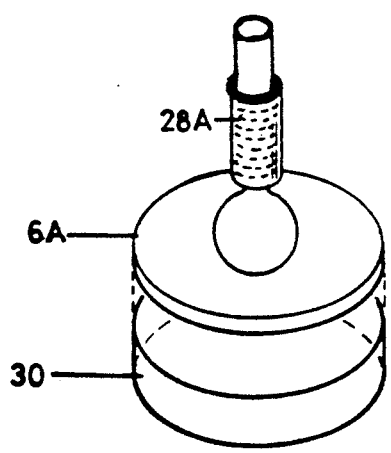

FIG. 2 illustrates the resonator bar assembly. It shows and demonstrates how mechanical vibration stimulations are converted into electronic signal generations via its sensing and monitoring device such as transducer 56 or microphone for amplification and reproductions. The strings slotted adjusting screws 52 are mounted and secured at both resonator bar and secondary resonator bar assemblies through which the set of strings 54 traverses for suspension; termination, calibration and tuning or retuning adjustments. The tubular housing accommodates the resonator bar 44 for mounting through its suspension springs 46 resonator bar mounting screws 48 and transducers or acoustical pick up 56. Accordingly, when all the necessary strings are securely mounted on both resonator bar and secondary resonator bar assemblies, the sound generation begins when fingers strum the strings and triggers a chain of vibrations at the string, induced into the resonator bar, felt and sensed by the transducers or microphones for electronic amplification and reproductions.

Figure 4:
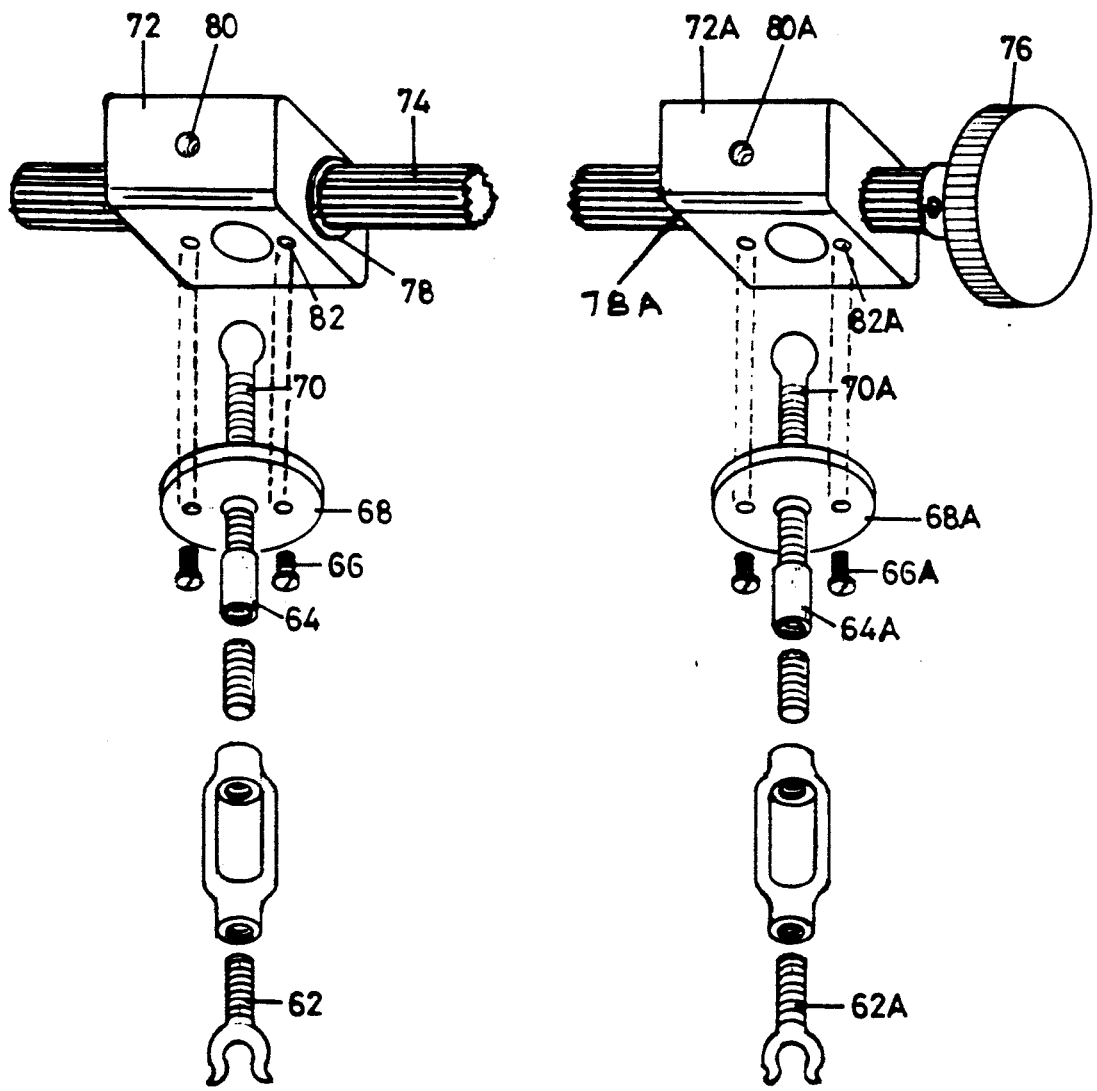
FIG. 4 shows the exploded bottom view support system of the front hanger assembly of section 3 of said set which holds the drivers entertainer set in place through its connecting accessories from the front hanger sliding blocks, through its ball joint engage against the concave spot of the hanger sliding block, and on to the turnbuckle for height adjustment and final mounting.
Figure 5:
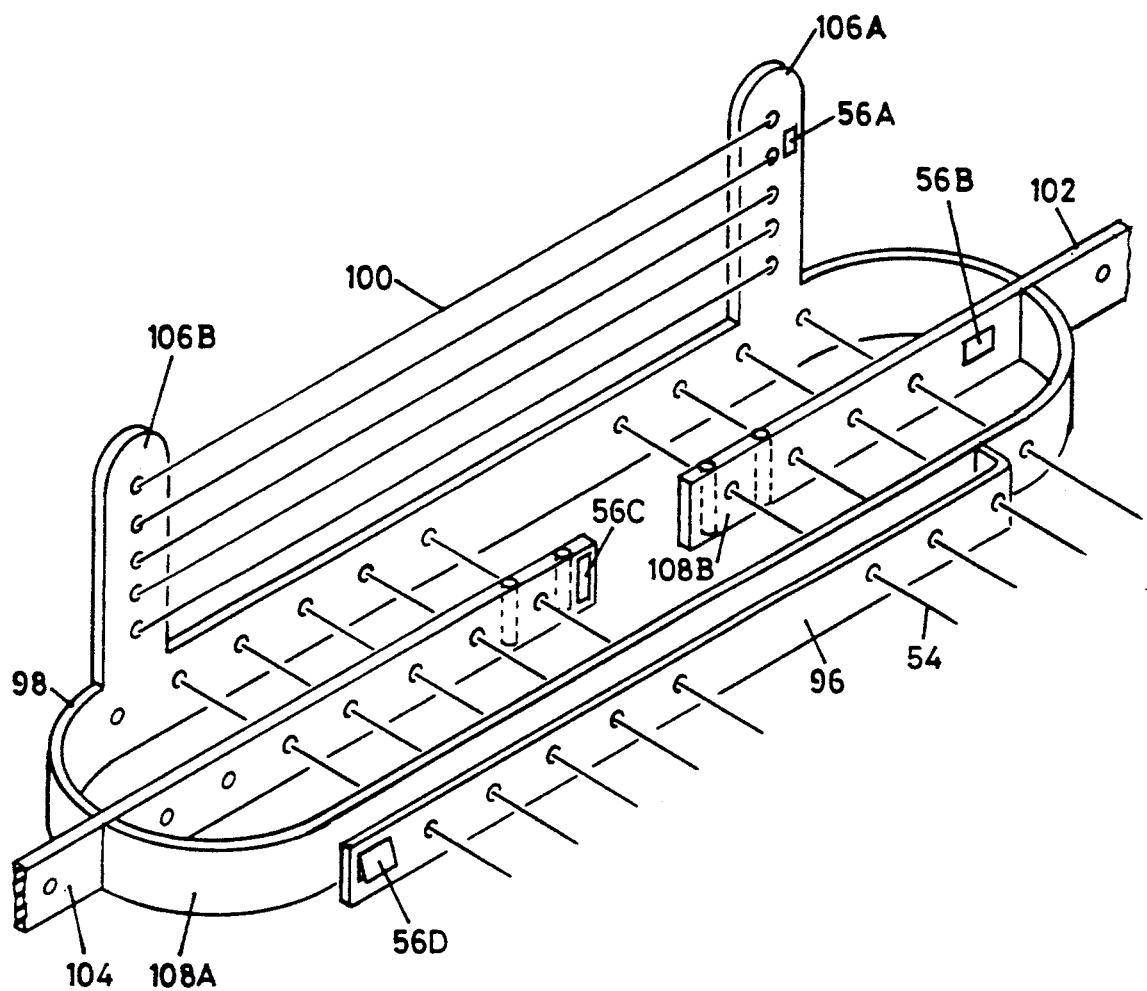
FIG. 5 is a perspective view of the secondary resonator bar assembly of section 4 of said set showing each end two mounting holes, secondary strings vibrator and curve resonator bars welded or machined for fabrication, interconnected to another resonator bar provided with threaded holes for the string's vibrations freeway and the corresponding adjusting screw mountings. The idea is to suspendedly align the necessary strings through the holes of the resonator bars on both sides without touching the edges of the resonator bar holes when the string's vibrations occur.

FIG. 4 shows the front hanger assembly. It portrays the exploded bottom view of the mounting support system. The ridge or threaded shaft 74, through which the hanger sliding blocks 72 inwardly and outwardly ride distantly controlled by a c clip 78, provides support. The rounded end of the turnbuckle extender rods 70 engages the concave slot of the hanger sliding blocks which is secured by the ball joint cap 68 via a set screw 66 to a turnbuckle extender joint 64 and to the turnbuckle rod height extender 62. It is only a matter of rotating the above mentioned parts to adjust the integral accessory of the entire front hanger support system.

FIG. 4 is a secondary resonator bar assembly. A newly added part that functionally compliments and augments the operating range of the resonator bar assembly. The transducers or monitoring microphones 56a, 56b, 56c can be located anywhere along the assembly to maximize vibrations and sound sensing for amplification. The string mounting stand 106a, 106b provide mounting spots for the secondary strings 100 which propagate the original vibration into a prolonged reverberation which essentially produces more harmonics and a wider frequency spectrum. Resonator bars 108a, 108b and tertiary resonator bar 96 has complimentary functions for trapping the ever needed vibrations such that every component in the vibrating path be adequately harnessed no matter how minute a vibration, to better improve frequency response.

The various component parts forming the recent invention may be made from organic and inorganic materials and from a variety of conventional materials including wood, optical plastic, rubber, fiber optic, glass, bamboo, rattan, metallic and exotic materials which offer excellent tensile and metallic memory characteristics such as titanium, enconel, stainless steel, and aluminum as determined by its various grading. As may now be understood, the driver's entertainer set provides an easily playable instrument, portable enough to be inserted behind the driver's back seat pouch.

With respect to the above description then, it is to be realized that the optimum dimensional relationship for the parts of the invention, to include variations in size, materials, shape, form, functions and manners of operation, assembly and use, are deemed readily apparent and obvious to one skilled in the art, and all equivalent relationships to those illustrated in the drawing and described in the specification are intended to be encompassed by the recent invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What are claimed as being new and desired to be protected by letters patent of the United States of America are as follows:

1. The support assembly for attachment to the steering wheel of a vehicle wherein the support assembly comprises in combination a bookrest assembly, a resonator bar assembly and a front hanger assembly for attaching the support assembly to a vehicular steering wheel; the book rest assembly further comprising a pair of upright parallel threaded rods and a hook holder member adjustably disposed on the parallel threaded rods, a threader coupler is threadedly attached to a lower end of each of the threaded rods and wherein each coupler is slideably mounted on a ridge shaft extending between the couplers; the resonator bar assembly comprises a pair of resonator bars parallel to each other having a plurality of strings disposed therein, extending parallel to each other and attached at opposite ends to opposing resonator bars, the resonator bars and strings disposed in a plane that extends outwardly from the upwardly extending book rest assembly; each of the resonator bars being disposed in a tubular housing, attached at one end to a clamp that is disposed on the ridge shaft and being attached at an opposite end to a sliding block; the sliding blocks are movably disposed on a second shaft that extends parallel to the strings; the clamp further includes a clip means for securing the support assembly to a steering wheel; the front hanger assembly further comprises a pair of adjustable elongated means each rotatably attached at one end to a respective sliding block and having another clip means attached to the opposite end for attaching the adjustable elongated means to a steering wheel, wherein adjustment of the elongated means provides angular adjustment to the resonator bar assembly when attached to a steering wheel.

2. The support assembly of claim 1 wherein said second shaft has threads on an outer surface thereof.

3. The support assembly of claim 1 wherein said second shaft has ridges on an outer surface thereof.

4. A support assembly of claim 1 further comprising an auxiliary resonator bar assembly having a transducer mounted thereon.

5. The support assembly of claim 1, comprising a detachable lighting system mounted on a flexible stem secured to the book rest assembly.

6. The support assembly of claim 1, comprising a string slotted adjusting screw for suspending, tuning, retuning, and mounting the string to the resonator bars.

7. The support assembly of claim 6, comprising a resonator bar mounting screw securing each resonator bar within its respective tubular housing.

8. The support assembly of claim 7, comprising suspension springs encircling the bar mounting screw and disposed between an inside surface of the tubular housing and each side of the resonator bar.

9. The support assembly of claim 1 wherein the adjustable elongated means include turnbuckles to provide angular adjustments for the support assembly.

* * * * *